(No Model.)

H. C. YOUNG.
WHEEL CULTIVATOR.

No. 598,462. Patented Feb. 1, 1898.

Witnesses:
Robert Everett
H. B. Keefer

Inventor:
Hiram C. Young
By James L. Norris
Atty.

UNITED STATES PATENT OFFICE.

HIRAM C. YOUNG, OF GOOSE CREEK, KENTUCKY.

WHEEL-CULTIVATOR.

SPECIFICATION forming part of Letters Patent No. 598,462, dated February 1, 1898.

Application filed July 19, 1897. Serial No. 645,110. (No model.)

*To all whom it may concern:*

Be it known that I, HIRAM C. YOUNG, a citizen of the United States, residing at Goose Creek, in the county of Jefferson and State of Kentucky, have invented new and useful Improvements in Wheel-Cultivators, of which the following is a specification.

This invention relates to wheeled cultivators, and has for its objects the provision of improved suspension devices for the forward end of each of two independent plow-beams and an improved lever mechanism combined with the said plow-beams and their suspension devices in such manner as to simplify and facilitate a shifting of the line of draft either to the right or left by a corresponding movement of a plow-handle, thereby causing the line of draft to always coincide with the line of motion, so as to make the plow easy to hold and guide and at the same time maintain the position of the shovels at right angles to the line of motion.

The invention consists in features of construction and novel combinations of parts in a cultivator, as hereinafter described and claimed.

Figure 1:
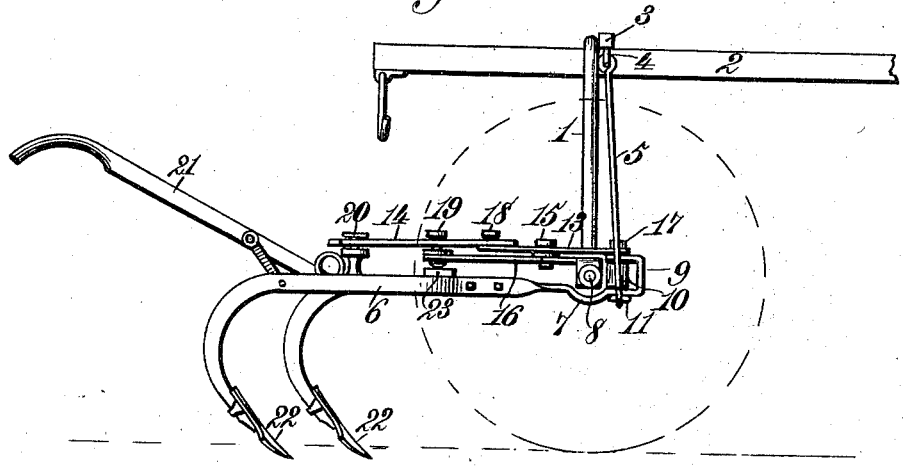
Figure 2:
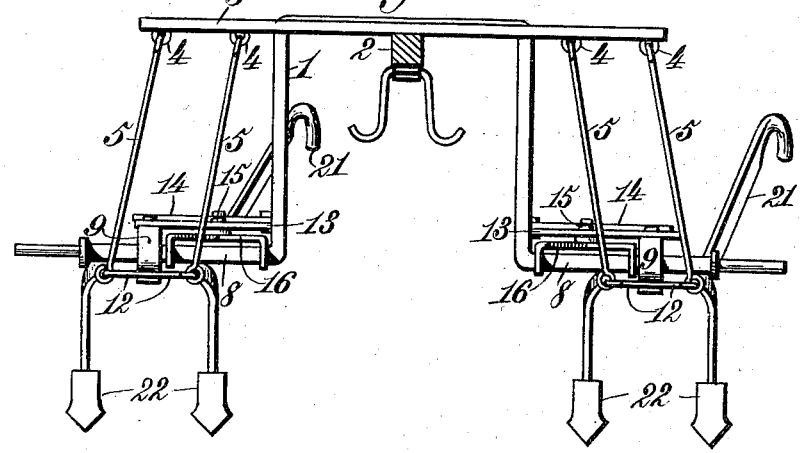
Figure 3:
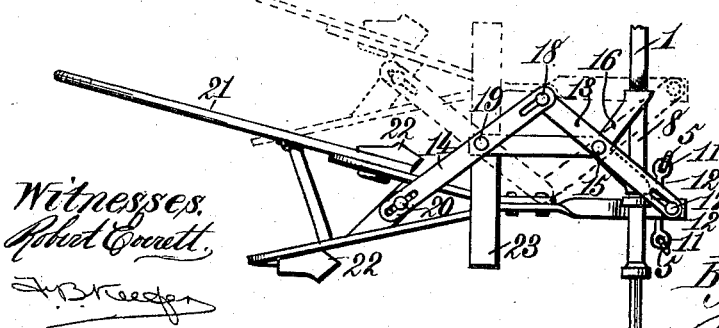

In the annexed drawings, illustrating the invention, Figure 1 is a side elevation of a two-horse cultivator embodying my improvements. Fig. 2 is a front elevation of the same with the pole or tongue in cross-section. Fig. 3 is a plan of the lever mechanism, showing in dotted lines its operation for shifting the line of draft.

Referring to the drawings, the numeral 1 designates the arched axle, and 2 the pole or tongue. There is secured to the pole a cross-bar 3 in front of and adjacent to the axle-arch. The under side of this cross-bar 3 is provided near its ends with eyes 4, in which are hooked the upper ends of laterally and forwardly swinging suspension-rods 5, with which the forward ends of the two independent plow-beams 6 are connected. In the forward portion of each plow-beam there is a depending bend 7 to clear the axle-arm 8, beneath which it is passed. At its forward end each plow-beam 6 is provided with a boxing or bearing 9 for a vertically-mounted roller 10, that is arranged to run along the front of the axle-arm as the line of draft is shifted. The lower ends of the suspension-rods 5 are engaged with eyes 11 on the ends of arms 12, projecting from both sides of the forward end of each plow-beam. By means of these suspension-rods 5 the forward ends of the two plow-beams are supported in such manner as to permit the beams to be independently moved to or from each other in shifting the line of draft and to instantly vary the distance between the plow-beams, as is frequently required in the operation of this class of cultivators.

In order that both ends of the plow-beam may move in substantial parallelism in shifting the line of draft, there is provision for connecting the forward and rear portions of each plow-beam by means of suitably-jointed levers 13 and 14, as shown. About midway its ends the forward lever 13 is fulcrumed on a pivot 15, supported at the bifurcation of a substantially Y-shaped frame 16, the forward diverging ends of which are trunnioned on the axle-arm. The front end of this lever 13 is provided with a slot that engages a pivot or stud 17 on the roller-boxing 9 at the forward end of the plow-beam. At its rear end the forward lever 13 carries a stud or pivot 18, that engages in a slot formed in the forward end of the rear lever 14, which is fulcrumed about midway its length on a pivot 19, supported by the rear end of the Y-frame 16, as shown. In the rear end of this rear lever 14 there is a slot that engages a stud 20, projecting vertically from a rear portion of the plow-beam. Thus by means of these levers 13 14 and their supporting-frame 16 the forward and rear portions of a plow-beam are connected in such manner that by simply moving the plow-handle 21 to the right or left, as the case may be, the line of draft will be automatically shifted in the same direction without affecting the proper operative position of the shovels 22 at right angles to the line of motion, as both ends of the plow-beam will move together and in substantial parallelism. The movements assumed by the jointed levers 13 14 in shifting the line of draft are indicated by the dotted lines in Fig. 3. For the purpose of affording at all times a suitable shifting support for the rear end of the lever-supporting frame 16 there may be provided a cross-bar 23 on each plow-beam. It will be observed that the levers 13 and 14 are supported close to the upper side of the plow-beam, so that in shifting the beams to or from each other their forward and rear ends are readily moved simultaneously without tendency to torsion or strain of any kind or at any point.

Each plow being independently supported at its forward end by laterally and forwardly swinging suspension-rods, it is obvious that the two plows can be readily moved toward and from each other, as required, while the arrangement of the shifting-levers with relation to the plow-beam and its suspension devices enables the shifting of the line of draft to be accomplished with great facility, so that the operator can readily guide either or both plows to avoid any hills of corn, for instance, that may be out of line with the row. These attachments for suspending the forward end of a plow-beam and shifting the line of draft can be conveniently applied to the usual parallel shovel-plows, such as are in common use, and will permit the machine to be always operated with the shovels in proper position at right angles to the line of motion and with instantaneous adjustment of the distance between the two plow-beams.

What I claim as my invention is—

1. In a cultivator, the combination with the independent plow-beams, the arched axle, the pole, and a cross-bar on said pole, of laterally-swinging suspension-rods having their upper ends attached to said cross-bar and their lower ends connected with the forward ends of the plow-beams, a lever-supporting frame trunnioned on each axle-arm and projecting in rear thereof, a cross-bar on each plow-beam beneath the rear end of said frame, and levers fulcrumed on said frame and pivotally connected with each other and with forward and rear portions of a plow-beam, whereby a movement of the plow-handle to the right or left will shift the line of draft at both ends of the plow-beam simultaneously and maintain the position of the shovels at right angles to the line of motion, substantially as described.

2. In a cultivator, the combination with the arched axle, the pole, and a cross-bar on said pole in front of the axle-arch, of the independent plow-beams having their forward ends extended beneath and in front of the axle-arms and provided with rollers adapted to run along the front of said axle-arms, laterally and forwardly swinging suspension-rods attached to the said pole cross-bar near its ends and connected with forward ends of the plow-beams, a lever-supporting frame trunnioned on each axle-arm and projecting rearward, a cross-bar on the plow-beam to afford a shifting support for the rear end of said frame, and levers fulcrumed on said frame and pivotally connected with each other and with forward and rear portions of a plow-beam, whereby a movement of either plow-handle to the right or left will shift the line of draft at both ends of a plow-beam and maintain the position of the shovels at right angles to the line of motion, substantially as described.

In testimony whereof I have hereunto set my hand in presence of two subscribing witnesses.

HIRAM C. YOUNG.

Witnesses:
WM. CARTER,
CHAS. A. RAY.